United States Patent
Hashimoto et al.

(10) Patent No.: US 6,915,939 B2
(45) Date of Patent: Jul. 12, 2005

(54) FRICTION AGITATION JOINING TOOL

(75) Inventors: Takenori Hashimoto, Oyama (JP); Shigetoshi Jhogan, Oyama (JP); Yoshitaka Nagano, Oyama (JP)

(73) Assignee: Showa Denko K.K., Tokyo (JP)

(*) Notice: Subject to any disclaimer, the term of this patent is extended or adjusted under 35 U.S.C. 154(b) by 0 days.

(21) Appl. No.: 10/380,629

(22) PCT Filed: Sep. 20, 2001

(86) PCT No.: PCT/JP01/08185
§ 371 (c)(1),
(2), (4) Date: Aug. 29, 2003

(87) PCT Pub. No.: WO02/24393
PCT Pub. Date: Mar. 28, 2002

(65) Prior Publication Data
US 2004/0108359 A1 Jun. 10, 2004

Related U.S. Application Data
(60) Provisional application No. 60/301,422, filed on Jun. 29, 2001.

(30) Foreign Application Priority Data
Sep. 21, 2000 (JP) ........................ 2000-287123

(51) Int. Cl.$^7$ .................... B23K 20/12; B23K 37/00
(52) U.S. Cl. ........................ 228/2.1; 228/112.1
(58) Field of Search ................... 228/2.1, 112.1

(56) References Cited

U.S. PATENT DOCUMENTS

| 6,206,268 B1 | * | 3/2001 | Mahoney | 228/112.1 |
| 6,264,088 B1 | * | 7/2001 | Larsson | 228/2.1 |
| 6,779,704 B2 | * | 8/2004 | Nelson et al. | 228/112.1 |
| 2004/0035914 A1 | * | 2/2004 | Hempstead | 228/112.1 |

FOREIGN PATENT DOCUMENTS

| GB | 2306366 | | 5/1997 |
| GB | 2306366 A | * | 5/1997 |
| JP | 11-10363 | | 1/1999 |
| JP | 2000-246465 A | * | 9/2000 |
| JP | 2001-71155 | | 3/2001 |
| JP | 2002-224859 A | * | 8/2002 |
| WO | 93/10935 | | 6/1993 |
| WO | WO 99/52669 A1 | * | 10/1999 |

OTHER PUBLICATIONS

CJ Dawes et al.: "Development of Improved tool designs for friction stir welding of aluminum" 1$^{st}$ International Symposium on Friction Stir Welding Jun. 14, 1999.

Kevin Colligan: "Dynamic material deformation during friction stir welding of aluminum" 1$^{st}$ International Symposium on Friction Stir Welding Jun. 14, 1999.

* cited by examiner

Primary Examiner—Lynne R. Edmondson
(74) Attorney, Agent, or Firm—Oblon, Spivak, McClelland, Maier & Neustadt, P.C.

(57) ABSTRACT

A friction agitation joining tool (10A, 10B) includes a rotor (11) having an end portion to be pressed onto at least one of surfaces of joining members (11a, 1b) and a probe (13) to be inserted into a joining portion (3) of the joining-members (1a, 1b), wherein the probe (13) has a diameter smaller than a diameter of the rotor (11). An end face (12) of the end portion of the rotor (11) is formed into a concave surface dented from a periphery of the end face (12) toward a rotational center of the end face (12). The probe (13) is protruded from the rotational center of the end face (12). The end face (12) is provided with a spiral groove (15) or an annular groove (16) surrounding the probe (13). By performing the joining operation with the joining tool (10A, 10B), a joined member with a good joint can be obtained.

22 Claims, 8 Drawing Sheets

FRICTION AGITATION JOINING TOOL

CROSS REFERENCE TO RELATED APPLICATIONS

This application is an application filed under 35 U.S.C. § 111(a) claiming the benefit pursuant to 35 U.S.C. § 119(e)(1) of the filing data of Provisional Application No. 60/301,422 filed Jun. 29, 2001 pursuant to 35 U.S.C. § 111(b).

TECHNICAL FIELD

The present invention relates to a friction agitation joining tool, a friction agitation joining method and a joined member manufacturing method. More particularly, the present invention relates to a friction agitation joining tool for joining joining-members made of metal such as aluminum or its alloy, a friction agitation joining method and a joined member manufacturing method using the joining tool.

BACKGROUND ART

A friction agitation joining method, which is one type of solid-phase joining method, has advantages in that the method can be applied to various joining-members irrespective of the kind metallic materials and causes less thermal stress due to the joining. In recent years, this method has been used as a joining means for manufacturing a joined member used as a floor member, a wall member, a ceiling member, a suspension arm member, etc., for ships, automobiles and railroad cars.

A conventional friction agitation joining method will now be described with reference to FIG. 11, in which two plate-shaped joining-members made of aluminum alloy are integrally joined in a butted manner.

In FIG. 11, the reference numeral 110A denotes a conventional friction agitation joining tool. The joining tool 110A is provided with a columnar rotor 111 and a pin-shaped probe 113 having a diameter smaller than that of the rotor 111. The probe 113 is integrally protruded from a rotational center of an end face 112 of the end portion of the rotor 111. The end face 112 of the rotor 111 is formed into a flat surface perpendicular to the rotation axis Q' of the rotor 111.

With the joining tool 110A, the probe 113 is rotated in accordance with the rotation of the rotor 111. The rotating probe 113 is inserted into a butted portion 103 of joining-members 101a and 101b so that the end portion of the rotating rotor 111 touches the surfaces of the joining-members 101a and 101b. Then, while maintaining this state, the end portion of the rotor 111 is advanced along the butted portion 103.

By the friction heat generated due to the rotation of the probe 113 and the friction heat generated due to the friction between the end face 112 of the end portion of the rotor 111 and the surfaces of the joining-members 101a and 101b, the joining-members 101a and 101b are softened at around the portion of the joining-members 101a and 101b where the end portion of the rotor 111 and the probe 113 contact. Then, the materials in the softened portion will receive the rotating force of the end portion of the rotor 111 and the rotating force of the probe 113 to be agitated and mixed. Furthermore, in accordance with the advance movement of the end portion of the rotor 111, the softened materials will be plastically fluidized to fill up a groove formed after the end portion of the rotor 111 and the probe 113 pass. Thereafter, the materials will be cooled and solidified by immediate loss of the friction heat. This phenomenon will be repeated in accordance with the advance movement of the end portion of the rotor 111 to thereby integrally join the joining-members 101a and 101b at the butted portion 103 (a joined portion 104). Thus, a joined member can be obtained.

By the way, in this friction agitation joining method, when the end portion of the rotor 110 is advanced along the butted portion 103, the materials of the joining-members 101a and 101b softened by the friction heat tend to be pushed out toward the outer surfaces of the joining-members 101a and 101b by receiving the advancing pressure of the end portion of the rotor 111. This causes the following drawbacks. Joining defects (e.g., hollow portions) due to the lack of materials may occur in the joined portion 104. Burrs formed by the pushed out materials may occur on the surface of the joined portion 104. The thickness of the joined portion 104 may decrease due to the pushed out materials. Accordingly, a joined member with good joining condition cannot be obtained.

In order to solve the above-mentioned problems, conventionally, the joining operation has been performed as follows. As shown in FIG. 11, at the time of the advance movement of the end portion of the rotor 111, the rotation axis Q' of the rotor 111 is inclined rearward relative to the joining direction (i.e., rearward to the moving direction) so that the advancing front edge of the end face 112 of the end portion of the rotor 111 is lifted up from the surfaces of the joining-members 101a and 101b. While keeping this inclined state, the end portion of the rotor 111 is advanced along the butted portion 103. In FIG. 11, the reference letter T' denotes a normal line at the inserted position of the probe on the surfaces of the joining-members 101a and 101b. The reference letter θ' denotes the inclined angle of the rotation axis Q' to the normal line T' when the rotation axis Q' of the rotor 111 is inclined rearward relative to the joining direction.

In this method, the end portion of the rotor 111 is advanced while keeping the inclined state in which the advancing edge of the end face 112 of the end portion of the rotor 111 is lifted up from the surfaces of the joining-members 101a and 101b so that the materials of the joining-members 101a and 101b are held by the end face 112 of the rotor 111 to prevent the escape of the materials therefrom. Thus, the above-mentioned problems can be solved.

However, in the conventional joining tool 110A, since the end face 112 of the end portion of the rotor 111 was formed into a flat surface, it was difficult to hold the materials of the joining-members 101a and 101b by the end face 112.

Furthermore, according to this method, the end portion of the rotor 111 had to be advanced in a state that the rotation axis Q' of the rotor 111 was inclined rearward relative to the joining direction. Therefore, it was difficult to perform the joining operation. The joining operation was particularly difficult when the joining portion curved along a circular line or the like.

The present invention was made in view of the above-mentioned technical background. The object of the present invention is to provide a friction agitation joining tool, a friction agitation joining method and a joined member manufacturing method, which can hold the materials of joining-members softened by the friction heat and can obtain a joined member with good joining condition.

Other objects and advantages of the present invention will be apparent from the following preferred embodiments.

DISCLOSURE OF INVENTION

According to the first aspect of the present invention of the present invention, a friction agitation joining tool includes a rotor having an end portion to be pressed onto at least one of surfaces of joining-members and a probe to be inserted into a joining portion of the joining-members, the prove having a diameter smaller than a diameter of the rotor, characterized in that: an end face of the end portion of the rotor is formed to have a concave surface dented from a periphery of the end face toward a rotational center of the end face, the probe is protruded from the rotational center of the end face, and the end face is provided with a spiral groove surrounding the probe.

In the joining tool according to the first aspect of the present invention, since the end face of the end portion of the rotor is formed into a concave surface dented from the periphery of the end face toward the rotational center of the end face, the materials of the joining-members softened by the friction heat can be held in the concave end face. Furthermore, since the groove is formed on the concave end face, the materials are caught by the groove, which improves the holding force of the materials. As a result, it is effectively prevented that the held materials are pushed out toward the surface of the joining-members, so that a joined-member with good joining condition can be obtained. In particular, since the groove is formed in a spiral manner, the materials caught by the groove will be plastically fluidized so as to gather toward the probe in accordance with the rotation of the rotor. As a result, it is more effectively prevented that the materials are pushed out toward the surfaces of the joining-members and that the holding force of the materials can be more improved. Thus, a joined member with higher joining quality can be obtained. Furthermore, by performing the joining operation using this joining tool, the materials of the joining-members can be firmly held without inclining the rotation axis of the rotor rearward relative to the joining direction. Thus, the end portion of the rotor can be easily advanced relative to the joining-members along the joining portion in cases where the joining portion of the joining-members extends straight and even in cases where it curves.

In the aforementioned first aspect of the present invention, it is preferable that the end face is provided with a plurality of the grooves with a predetermined phase difference. In this case, the holding force and the gathering force of the materials will be improved. Thus, it is effectively prevented that the materials are pushed out toward the surfaces of the joining-members.

In the aforementioned first aspect of the present invention, it is preferable that a width w1 of the groove falls within a range of from 0.5 to 2.0 mm. In this case, the above-mentioned material-holding effects can be obtained assuredly.

In the aforementioned first aspect of the present invention, it is preferable that an average depth h1 of the groove falls within a range of from 0.5×w1 to 2×w1 mm, where w1 is a width of the groove. In this case, the above-mentioned effects can be obtained assuredly.

In the aforementioned first aspect of the present invention, it is preferable that the probe is provided with an agitation protrusion on an outer surface thereof. In this case, the materials can be agitated effectively.

According to the second aspect of the present invention, a friction agitation joining tool includes a rotor having an end portion to be pressed onto at least one of surfaces of joining-members and a probe to be inserted into a joining portion of the joining-members, the prove having a diameter smaller than a diameter of the rotor, characterized in that: an end face of the end portion of the rotor is formed to have a concave surface dented from a periphery of the end face toward a rotational center of the end face, the probe is protruded from the rotational center of the end face, and the end face is provided with an annular groove surrounding the probe.

With the joining tool of the second aspect of the present invention, since the end face of the end portion of the rotor is formed into a concave surface dented from the periphery of the end face toward the rotational center of the end face, the materials of the joining-members softened by the friction heat can be held in the concave end face. Furthermore, since the groove is formed on the end face, the materials are caught by the groove, which improves the holding force of the materials. As a result, it is effectively prevented that the held materials are pushed out toward the surfaces of the joining-members. Thus, a joined member with good joining condition can be obtained. Furthermore, by performing the joining operation using this joining tool, the materials of the joining-members can be firmly held without inclining the rotation axis of the rotor rearward relative to the joining direction. Thus, the end portion of the rotor can be easily advanced relative to the joining-members along the joining portion even in cases where the joining portion of the joining-members curves as well as where it extends straight.

In the aforementioned second aspect of the present invention, it is preferable that the end face is provided with a plurality of the grooves concentrically about the rotational center of the end face of the rotor. In this case, the holding force of the materials is improved. Thus, it is effectively prevented that the materials are pushed out toward the surfaces of the joining-members.

In the aforementioned second aspect of the present invention, it is preferable that a width w2 of the groove falls within a range of from 0.5 to 2.0 mm. In this case, the above-mentioned material-holding effects can be obtained assuredly.

In the aforementioned second aspect of the present invention, it is preferable that an average depth h2 of the groove falls within a range of from 0.5×w2 to 2×w2 mm, where w2 is a width of the groove. In this case, the above-mentioned material-holding effects can be obtained assuredly.

In the aforementioned second aspect of the present invention, it is preferable that the probe is provided with an agitation protrusion on an outer surface thereof. In this case, the materials can be agitated effectively.

According to the third aspect of the present invention, a friction agitation joining tool includes a rotor having an end portion to be pressed onto at least one of surfaces of joining-members and a probe to be inserted into a joining portion of the joining-members, the prove having a diameter smaller than a diameter of the rotor, characterized in that: an end face of the end portion of the rotor is formed to have a concave surface dented from a periphery of the end face toward a rotational center of the end face, the probe is protruded from the rotational center of the end face, and the rotor is provided with stepped portions on an entire periphery of the end portion of the rotor, the stepped portions approaching toward the probe stepwise.

With the joining tool according to the third aspect of the present invention, the stepped portions approaching toward the probe stepwise are formed on the outer periphery of the end portion of the rotor. Thus, when the end portion of the rotor is pressed on the surfaces of the joining-members, the shoulder portion of each stepped portion is strongly pressed onto the surfaces of the joining-members. As a result, it is more effectively prevented that the materials are pushed out toward the surface of the joining-members. Furthermore, the holding force of the materials can be further improved. Thus, a joined member with higher joining quality can be obtained. Furthermore, by performing the joining operation using this joining tool, the materials of the joining-members can be firmly held without inclining the rotation axis of the rotor rearward relative to the joining direction. Thus, the end portion of the rotor can be easily advanced relative to the joining-members along the joining portion even in cases where the joining portion of the joining-members curves as well as where it extends straight.

In the aforementioned third aspect of the present invention, it is preferable that the rotor is provided with a plurality of the stepped portions. In this case, the outer peripheral surface of the end portion of the rotor is more strongly pressed onto the surfaces of the joining-members. As a result, it is more effectively prevented that the materials are pushed out toward the surfaces of the joining-members.

In the aforementioned third aspect of the present invention, it is preferable that a radius difference s of the stepped portions falls within a range of from 0.3 to 1 mm. In this case, the above-mentioned material-holding effects can be obtained assuredly.

In the aforementioned third aspect of the present invention, it is preferable that the probe is provided with an agitation protrusion on an outer surface thereof. In this case, the materials can be agitated effectively.

According to the fourth aspect of the present invention, a friction agitation joining method using the friction agitation joining tool according to the first aspect of the present invention, comprises the steps of: inserting the rotating probe into a joining portion of the joining-members; pressing the end portion of the rotating rotor on at least one of surfaces of the joining-members; and advancing the end portion of the rotor relative to the joining-members along the joining portion.

With this friction agitation joining method, by using the friction agitation joining tool according to the first aspect of the present invention, it is effectively prevented that the materials are pushed out toward the surfaces of the joining-members. A joined member with good joining condition can be obtained. In particular, since the groove is made in a spiral manner, the materials caught by the groove is plastically fluidized to gather toward the probe in accordance with the rotation of the rotor. Thus, it is more effectively prevented that the materials are pushed out toward the surface of the joining-members. Furthermore, the holding force of the materials can be further improved. As a result, a joined member with higher joining quality can be obtained.

In the aforementioned fourth aspect of the present invention, it is preferable that the end portion of the rotor is advanced relative to the joining-members without inclining a rotation axis of the rotor relative to a joining direction. In this case, the end portion of the rotor can be easily advanced relative to the joining-members along the joining portion even in cases where the joining portion of the joining-members curves as well as where it extends straight.

In the aforementioned fourth aspect of the present invention, it is preferable that the rotor is driven in a rotational direction that the groove extends from the center of the end face of the rotor around the probe as seen from the end face of the rotor. In this case, the materials caught by the groove assuredly gather toward the probe due to the rotating force of the end face of the end portion of the rotor. As a result, it is more effectively prevented that the materials are pushed out toward the surfaces of the joining-members. Furthermore, the holding force of the materials can be further improved. As a result, a joined member with higher joining quality can be obtained.

According to the fifth aspect of the present invention, a friction agitation joining method using the friction agitation joining tool according to the second aspect of the present invention, comprising the steps of: inserting the rotating probe into the joining portion of the joining-members; pressing the end portion of the rotating rotor on at least one of surfaces of the joining-members; and advancing the end portion of the rotor relative to the joining-members along the joining portion.

With this friction agitation joining method, by using the friction agitation joining tool according to the second aspect of the present invention, it is effectively prevented that the materials are pushed out toward the surface of the joining-members. A joined member with good joining condition can be obtained.

In the aforementioned fifth aspect of the present invention, it is preferable that the end portion of the rotor is advanced relative to the joining-members without inclining a rotation axis of the rotor relative to a joining direction. In this case, the end portion of the rotor can be easily advanced relative to the joining-members along the joining portion even in cases where the joining portion of the joining-members curves as well as where it extends straight.

According to the sixth aspect of the present invention, a friction agitation joining method using the friction agitation joining tool according to the third aspect of the present invention, comprising the steps of: inserting the rotating probe into the joining portion of the joining-members; pressing the end portion of the rotating rotor on at least one of surfaces of the joining-members; and advancing the end portion of the rotor relative to the joining-members along the joining portion.

With this friction agitation joining method, by using the friction agitation joining tool according to the third aspect of the present invention, it is effectively prevented that the materials are pushed out toward the surfaces of the joining-members. A joined member with good joining condition can be obtained.

In the aforementioned sixth aspect of the present invention, it is preferable that the end portion of the rotor is advanced relative to the joining-members without inclining a rotation axis of the rotor relative to a joining direction. In this case, the end portion of the rotor can be easily advanced relative to the joining-members along the joining portion even in cases where the joining portion of the joining-members curves as well as where it extends straight.

According to the seventh aspect of the present invention, a method of manufacturing a joined member in which a first joining-member and a second joining-member are joined integrally at a joining portion thereof, comprises the steps of: using the friction agitation joining tool according to the first aspect of the present invention; inserting the rotating probe into the joining portion; pressing the end portion of the rotating rotor on at least one of surfaces of the joining-members; and advancing the end portion of the rotor relative to the joining-members along the joining portion to thereby join the first joining-member and the second joining-member at the joining portion.

With this method of manufacturing a joined member, due to the same effects as in the aforementioned fourth invention, a joined member with higher joining quality can be obtained.

In the aforementioned seventh aspect of the present invention, it is preferable that the end portion of the rotor is advanced relative to the joining-members without inclining a rotation axis of the rotor relative to a joining direction. In this case, the end portion of the rotor can be easily advanced relative to the joining-members along the joining portion even in cases where the joining portion of the joining-members curves as well as where it extends straight.

In the aforementioned seventh aspect of the present invention, it is preferable that the rotor is driven in a rotational direction that the groove extends from the center of the end face of the rotor around the probe as seen from the end face of the rotor. In this case, the materials caught by the groove gather assuredly toward the probe due to the rotating force of the end face of the end portion of the rotor. As a result, it is more effectively prevented that the materials are pushed out toward the surfaces of the joining-members. Furthermore, the holding force of the materials can be further improved. As a result, a joined member with higher joining quality can be obtained.

According to the eighth aspect of the present invention, a method of manufacturing a joined member in which a first joining-member and a second joining-member are joined integrally at a joining portion thereof, comprising the steps of: using the friction agitation joining tool according to the second aspect of the present invention; inserting the rotating probe into the joining portion; pressing the end portion of the rotating rotor on at least one of surfaces of the joining-members; and advancing the end portion of the rotor relative to the joining-members along the joining portion to thereby join the first joining-member and the second joining-member at the joining portion.

With this method of manufacturing a joined member, due to the same effects as in the aforementioned fifth aspect of the present invention, a joined member with high joining quality can be obtained.

In the aforementioned eighth aspect of the present invention, it is preferable that the end portion of the rotor is advanced relative to the joining-members without inclining a rotation axis of the rotor relative to a joining direction. In this case, the end portion of the rotor can be easily advanced relative to the joining-members along the joining portion even in cases where the joining portion of the joining-members curves as well as where it extends straight.

According to the ninth aspect of the present invention, a method of manufacturing a joined member in which a first joining-member and a second joining-member are joined integrally at a joining portion thereof, comprising the steps of: using the friction agitation joining tool according to the third aspect of the present invention; inserting the rotating probe into the joining portion; pressing the end portion of the rotating rotor on at least one of surfaces of the joining-members; and advancing the end portion of the rotor relative to the joining-members along the joining portion to thereby join the first joining-member and the second joining-member at the joining portion.

In this method of manufacturing a joined member, due to the same effects as in the aforementioned sixth aspect of the present invention, a joined member with high joining quality can be obtained.

In the aforementioned ninth aspect of the present invention, it is preferable that the end portion of the rotor is advanced relative to the joining-members without inclining a rotation axis of the rotor relative to a joining direction. In this case, the end portion of the rotor can be easily advanced relative to the joining-members along the joining portion and even in cases where the joining portion of the joining-members curves as well as where it extends straight.

BEST MODE FOR CARRYING OUT THE INVENTION

The present invention will be described in detail with reference to the attached drawings.

Figure 1:
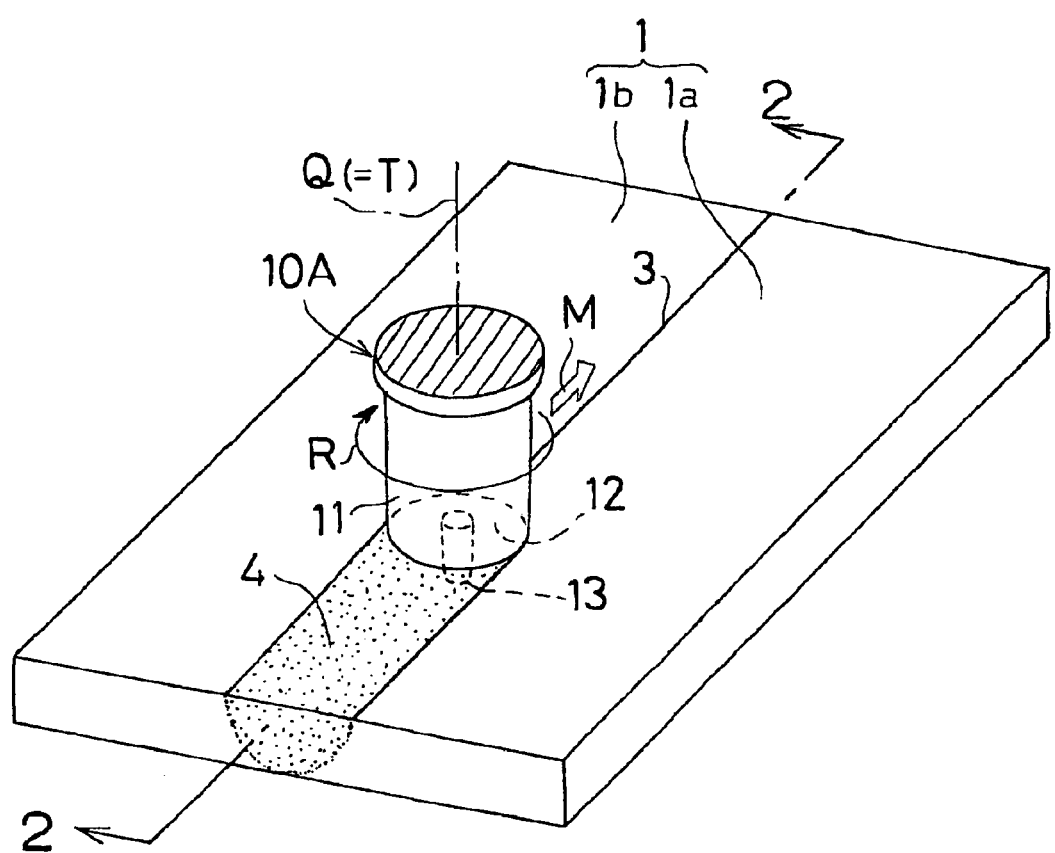
FIG. 1 is a perspective view showing the state in which a joining operation is in progress by using the joining tool according to a first embodiment.

FIGS. 1 to 4 show a first embodiment according to the present Invention. In FIG. 1, the reference numeral 1a denotes a flat metallic first joining-member, and the reference numeral 1b denotes a flat metallic second joining-member. In this embodiment, both the joining-members 1a and 1b are made of aluminum or its alloy. The thickness of the first joining-member 1a and that of the second joining-member 1b have the same dimension. The lateral side of the first joining-member 1a and that of the second joining-member 1b are butted such that their upper surfaces flush with each other. In this butted state, these joining-members 1a and 1b are supported by a supporting member (not shown) from the rear surfaces thereof.

In this embodiment, the butted portion 3 of the joining-members 1a and 1b are joined by a friction agitation joining method along the butted portion to produce a butt-joined member. Accordingly, in this embodiment, the butted portion 3 of the joining-members 1a and 1b constitutes a joining portion, or a portion to be joined.

In FIG. 1, the reference numeral 10A denotes a joining tool for performing a friction agitation joining method. The joining tool 10A is provided with a columnar rotor 11 and a pin-shaped probe 13 having a diameter smaller than that of the rotor 11. The end portion of the rotor 11 is to be pressed onto the surfaces of the joining-members 1a and 1b. The probe 13 is to be inserted into the butted portion 3. The rotor 11 and the probe 13 are made of heat-resistant materials that are harder than the joining-members 1a and 1b and can stand friction heat generated at the time of joining.

Figure 4:
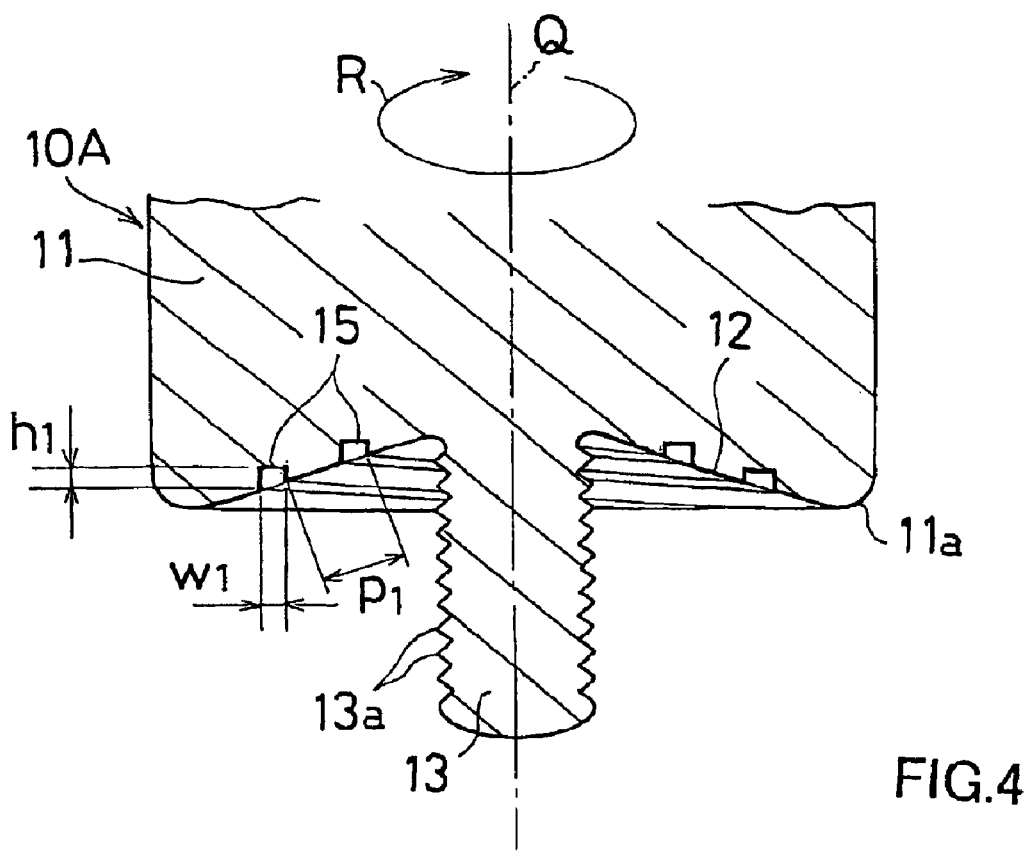
FIG. 4 is a cross-sectional view taken along the lines 4—4 in FIG. 3.

In the joining tool 10A, as shown in FIG. 4, the corner portion 11a of the peripheral surface of the end portion of the rotor 11 and the end face 12 are beveled roundly along the entire circumference thereof. This can prevent the surfaces of the joining-members 1a and 1b from being damaged when the corner portion 11a is pressed onto the surfaces.

The end face 12 of the end portion of the rotor 11 is formed to have a concave surface of a reverse V-shaped cross-section dented from the periphery of the end face 12 toward the rotational center thereof with a predetermined inclination. From the rotational center portion of the end face 12, the probe 13 is integrally protruded so as to coincide with the rotation axis Q of the rotor 11.

Figure 3:
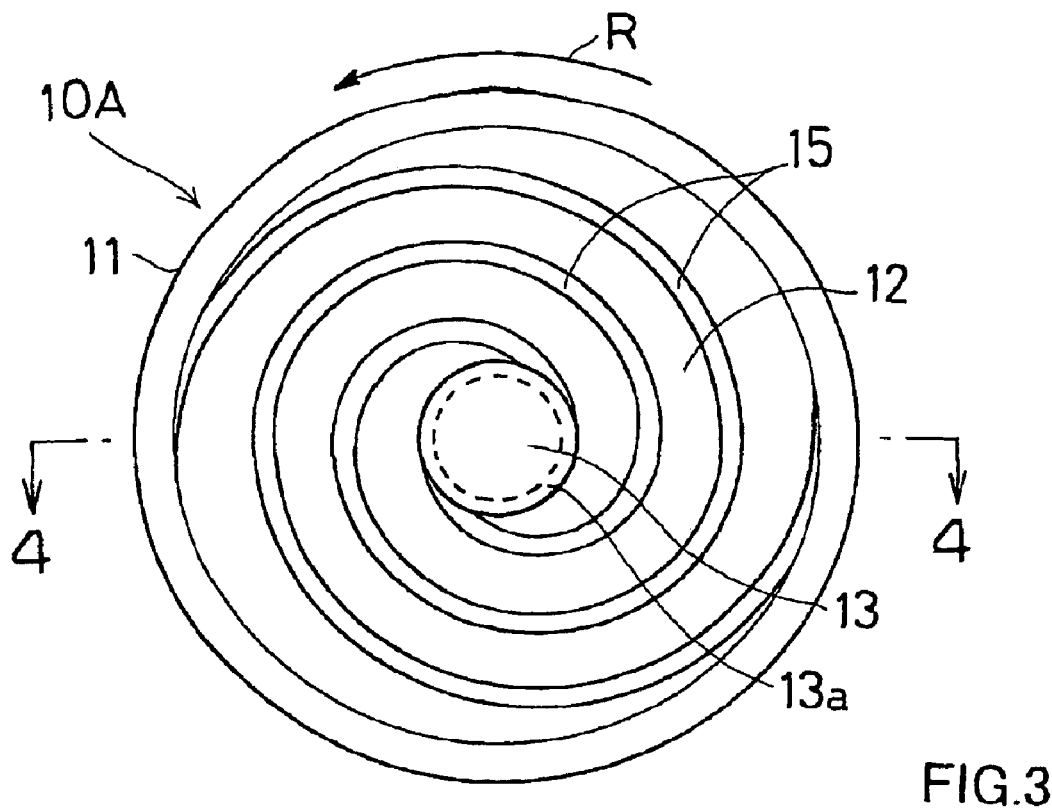
FIG. 3 is an enlarged bottom plan view of the joining tool of the first embodiment.

Furthermore, as shown in FIG. 3, on the end face 12 of the rotor 11, two spiral grooves 15 and 15 are formed so as to surround the probe 13 with 180° phase difference. These grooves 15 are 15 are formed on the region from the basal end of the probe 13 to the outer periphery of the end face 12. As shown in FIG. 4, each groove 15 is formed to have a U-shaped cross-section so as to catch the materials of the joining-members 1a and 1b softened by the friction heat, to thereby improve the holding power of the materials in the concave end face 12 at the time of joining.

It is preferable that the width w1 of the groove 15 falls within the range of from 0.5 mm to 2.0 mm. It is preferable that the average depth h1 of the groove 15 falls within the range of from 0.5×w1 to 2.0×w1 mm. Furthermore, it is preferable that the pitch p1 of the groove 15 in the cross-sectional plane including the rotation axis Q of the rotor 11 falls within the range of from 1.5×w1 to 4.0 ×w1 mm. By setting the values as mentioned above, the aforementioned functions can be obtained assuredly.

On the other hand, on the outer surface of the probe 13, a spiral agitation protrusion 13a having a triangular cross-section is formed along generally the entire length of the probe 13. In this embodiment, the probe 13 is formed like a shaft of M5 screw and the spiral agitation protrusion 13a corresponds to the thread of the screw. The agitation protrusion 13a is provided in order to efficiently agitate the materials of the joining-members 1a and 1b softened by the friction heat.

Figure 2:
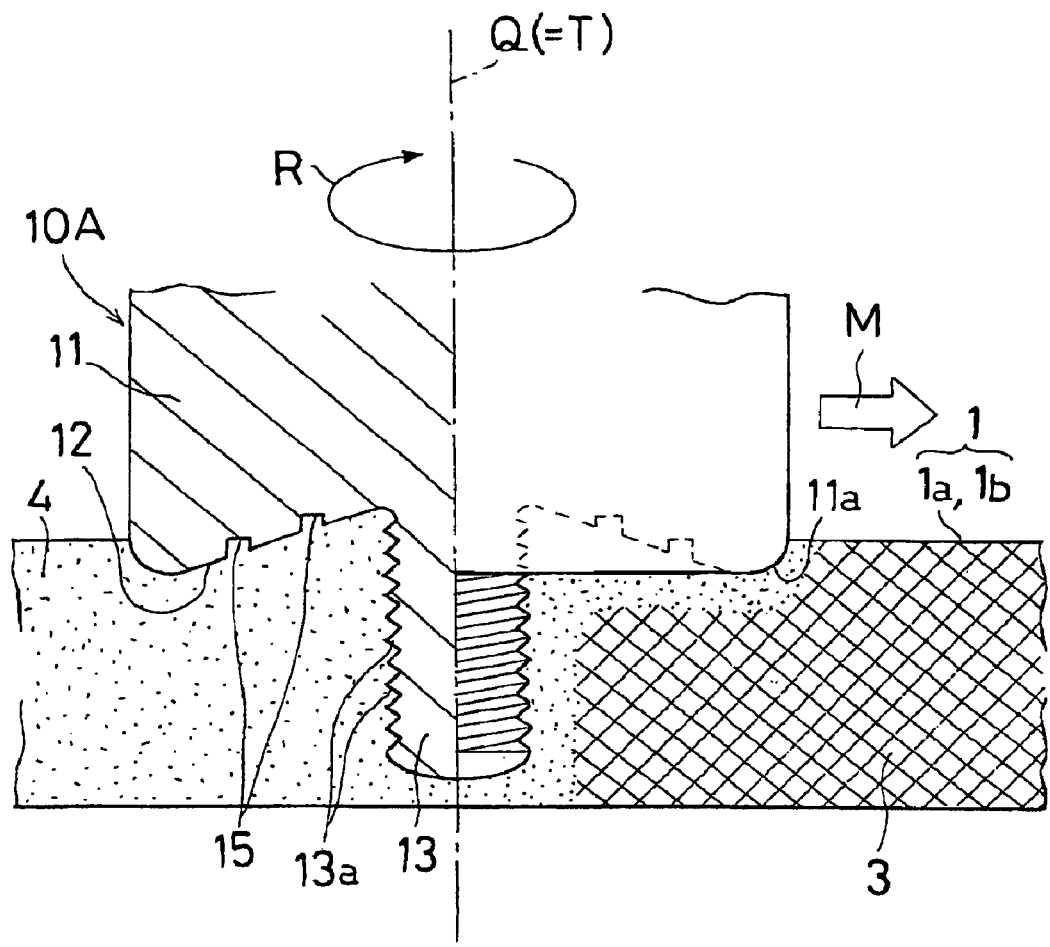
FIG. 2 is an enlarged cross-sectional view taken along the lines 2—2 in FIG. 1.

As shown in FIG. 1, when the butted portion 3 of the joining-members 1a and 1b is joined by using the joining tool 10A having the aforementioned structure, the rotor 11 is rotated about the rotation axis Q in the predetermined rotational direction R (the rotational direction R will be described later). Thus, the probe 13 rotates together with the rotor 11. Then, the rotating probe 13 is inserted into the butted portion 3 from the upper surfaces the joining-members 1a and 1b until the end portion of the rotating rotor 11 is pressed onto the surfaces with the rotation axis Q of the rotor 11 coincided with a normal line T at the insertion position of the probe 13. At this time, by pressing the end portion of the rotor 11 onto the surfaces of the joining-members 1a and 1b, the end portion of the rotor 11 is slightly inserted into the joining-members 1a and 1b as shown in FIG. 2. While maintaining this state, the end portion of the rotor 11 is made to advance along the butted portion 3. This advancing direction M is the joining direction. In the present invention, the probe 13 may be inserted into the butted portion 3 from the longitudinal end of the joining-members 1a and 1b.

Then, by the friction heat generated in accordance with the rotation of the probe 13 and the friction heat generated in accordance with the friction between the end face 12 of the end portion of the rotor 11 and the surfaces of the joining-members 1a and 1b, the joining-members 1a and 1b are softened at around the contact portion between the joining-members 1a and 1b and the end portion of the rotor 11 and the probe 13. The softened materials of the joining-members 1a and 1b will be held in the concave end face 12 of the rotor 11 by receiving the pressing force from the end portion of the rotor 11. Thus, it is effectively prevented that the materials are pushed out toward the outer surfaces of the joining-members 1a and 1b. Furthermore, by receiving the pressing force from the end portion of the rotor 11, the materials will be filled up in the groove 15, which assuredly prevents the escape of the materials.

In this way, the materials of the joining-members 1a and 1b held inside the concave end face 12 of the end portion of the rotor 11 will be agitated and mixed by the rotating force of the end portion of the rotor 11 and the probe 13. The materials are plastically fluidized so as to fill up a groove formed after the end portion of the rotor 11 and the probe 13 pass in accordance with the advance movement of the end portion of the rotor 11. Then, the materials are cooled and solidified due to immediate loss of the friction heat. This phenomenon will be repeated in accordance with the advance movement of the end portion of the rotor 11. This enables the joining-members 1a and 1b to be joined integrally along the entire length of the butted portion 3, whereby a prescribed joined member can be obtained. In FIG. 1, the reference numeral 4 denotes a joined portion formed at the butted portion 3 of the joining-members 1a and 1b.

In the first embodiment, the rotational direction R of the rotor 11 is set to the direction as shown in FIG. 3. That is, the rotor 11 is driven in the direction that the groove 15 extends from the center of the end face 12 of the rotor 11 toward the periphery of the end face 12 as seen from the end face 12 of the rotor 11. This enables the materials caught by the groove 15 to be plastically fluidized to gather toward the probe 13 in accordance with the rotation of the end face 12 of the rotor 11. Therefore, the escape of the materials can be prevented more assuredly to thereby form a better joined portion 4.

In the aforementioned friction agitation joining method, the joining tool 10A in which the end face 12 of the end portion of the rotor 11 is formed into the aforementioned concave surface having the aforementioned spiral groove 15 is used. Therefore, the materials of the joining-members 1a and 1b can be held firmly inside the concave end face 12 without inclining the rotational axis Q of the rotor 11 rearward relative to the joining direction M. Thus, with the joining tool 10A, the advancing operation of the end portion of the rotor 11 (i.e., joining operation) can be done in the state that the rotation axis Q of the rotor 11 coincides with the normal line T of the surfaces of the joining-members 1a and 1b at the prove inserted position (i.e., Q=T), or in the state that the rotation axis Q is positioned in the flat plane perpendicular to the joining direction M. Accordingly, the advancing operation of the end portion of the rotor 11 (i.e., joining operation) can be easily performed even in cases where the butted portion 3 curves (not shown) as well as where the butted portion 3 extends straightly as in the present embodiment.

Furthermore, according to the joining tool 10A, since the materials of the joining-members 1a and 1b can be held firmly in the concave end face 12, joining defects (e.g., hollow portions) due to the lack of materials, and burrs due to the escape of the materials can be prevented. In addition, the thickness of the joined portion can be prevented from being decreased. Accordingly, a joined member with good joining condition can be obtained using the aforementioned joining tool 10A.

In addition, in the present invention, the rotor 11 may have one or a plurality of spiral grooves 15. It is especially preferable that the rotor 11 has a plurality of spirals.

Figure 5:
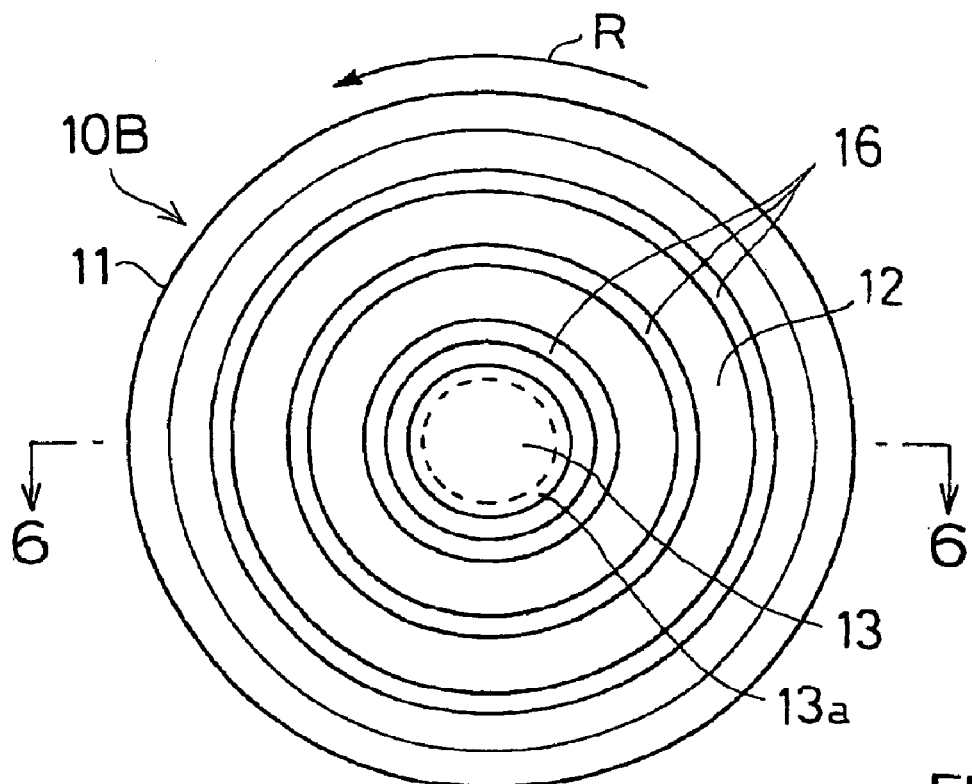
FIG. 5 is a bottom plan view of a joining tool according to a second embodiment.
Figure 6:
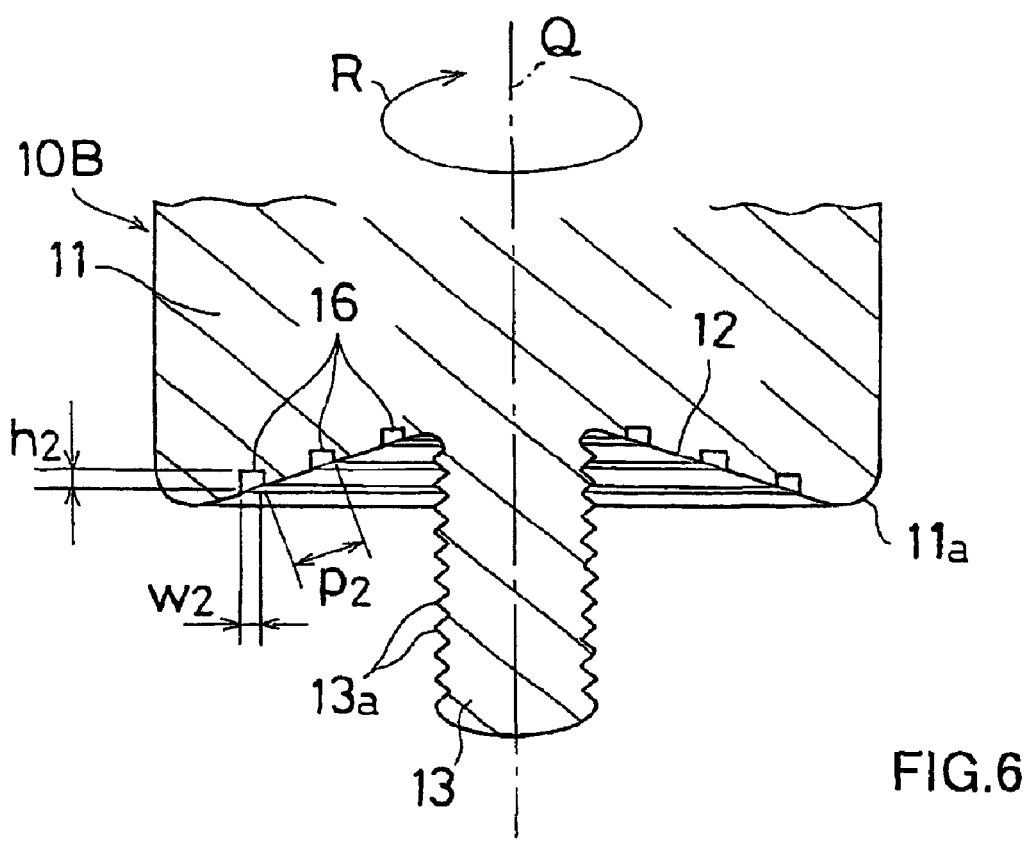
FIG. 6 is a cross-sectional view taken along the lines 6—6 in FIG. 5.

FIGS. 5 and 6 show a joining tool 10B according to a second embodiment of the present invention. In these figures, the same reference numerals are allotted to the corresponding elements of the joining tool 10A of the first embodiment.

In the joining tool 10B, on the end face 12 of the end portion of the rotor 11, three annular grooves 16 having different radius are provided eccentrically around the rotational center so as to surround the probe 13. The preferable width w2, the average depth h2 and the pitch p2 of the groove 16 are the same as those of the groove 15 of the joining tool 10A according to the first embodiment.

The other structures of, the joining tool 10B are the same as those of the joining tool 10A according to the first embodiment. The joining method using the joining tool 10B is the same as the method explained in the first embodiment. Accordingly, the same explanation will be omitted.

In the joining tool 10B, by receiving the pressing force from the end portion of the rotor 11, the materials of the joining-members 1a and 1b are held inside the concave end face 12 of the end portion of the rotor 11. In addition, the materials can be held assuredly by the groove 16, resulting in a joined member with good joining condition.

In the present invention, the rotor 11 may have one or a plurality of annular grooves 16. It is preferable that the rotor 11 has a plurality of grooves 16.

Figure 7:
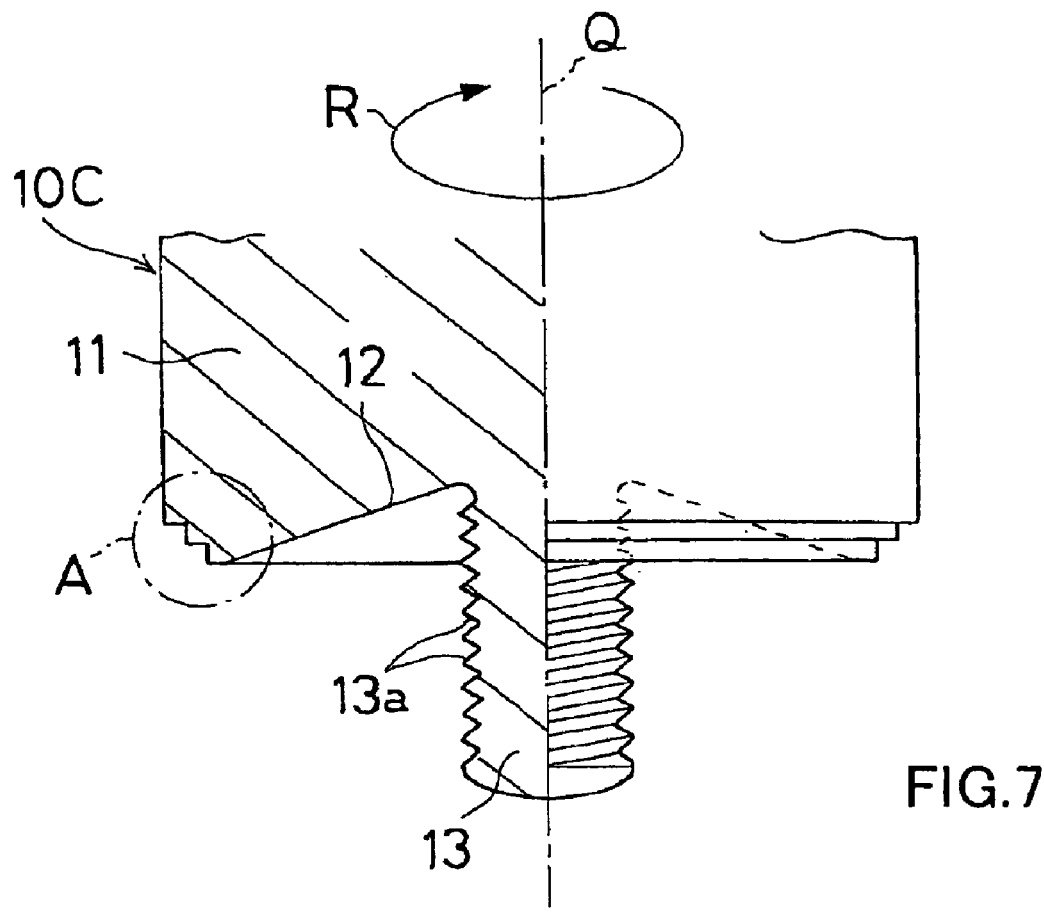
FIG. 7 is a half cross-sectional side view of the joining tool of the third embodiment.
Figure 8:
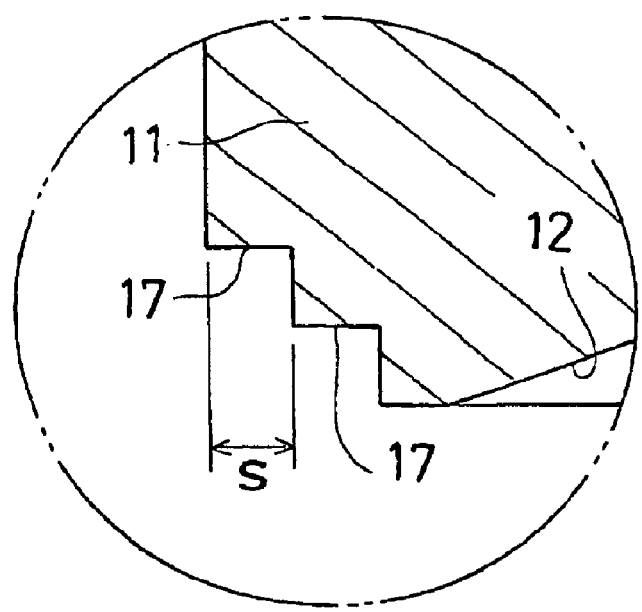
FIG. 8 is an enlarged cross-sectional view of a portion A surrounded by the broken line in FIG. 7.

FIGS. 7 and 8 show a joining tool 10C according to a third embodiment of the present invention. In these figures, the same reference numerals are allotted to the corresponding elements of the joining tool 10A according to the first embodiment.

In the joining tool 10C, on the end face 12 of the end portion of the rotor 11, no groove 15 is provided, but two stepped portions each having L-shaped cross-section are provided on the entire periphery of the end portion of the rotor 11 around the rotation axis Q of the rotor 11. The stepped portions are formed so as to approach toward the probe 13 stepwise from the upper one to the lower one. In FIG. 8, the reference numeral 17 denotes a shoulder portion of each stepped portion.

The other structures of the joining tool 10C are the same as those of the joining tool 10A according to the first embodiment. The joining method using the joining tool 10C is the same as the method explained in the first embodiment. Accordingly, the same explanation will be omitted.

In the joining tool 10C, since the two-stepped portion are formed on the entire periphery of the end portion of the rotor 11, the shoulder portions 17 and 17 can be pressed onto the joining-members 1a and 1b by pressing the end portion of the rotor 11 onto the surfaces of the joining-members 1a and 1b. As a result, the external peripheral surface of the end portion of the rotor 11 can be assuredly pressed onto the surface of the joining-members 1a and 1b. Accordingly, it is effectively prevented that the materials of the joining-members 1a and 1b held in the concave end face 12 escape therefrom. Thus, a butt-joined member with good joining condition can be easily obtained.

In the joining tool 10C, in order to assuredly obtain the above-mentioned effects, it is preferable that the radius difference s of the adjacent stepped portions falls within the range of from 0.3 to 1.0 mm.

In the present invention, the rotor 11 may have one, three or more stepped portions. It is more preferable that the rotor 11 has a plurality of stepped portions.

The above explanation is directed to the first to third embodiments of the present invention. However, the present invention is not limited to these embodiments, but may be modified variously.

For example, the end face 12 of the end portion of the rotor 11 of the joining tool may be formed into a concave surface having an arc-shaped cross-section gradually dented from the periphery of the end surface 12 toward the rotational center thereof.

The joining tool may be provided with stepped portions at the peripheral surface of the end portion of the rotor 11 and a spiral groove 15 or annular grooves 16 on the end face 12 of the rotor 11.

As for the joining operation, it may be possible to perform a joining operation such that the joining-members 1a and 1b are advanced with the position of the rotor 11 fixed so that the butted portion 3 passes the end portion of the rotor 11.

Furthermore, in the present invention, the friction agitation joining tool and the method of manufacturing a joined member using such a tool can be applied not only to a joining operation of a butted portion of joining-members as explained above but also to a joining operation of various types of joining portion such as a stacked portion of joining-members and an intersection of joining-members.

Next, examples according to the present invention will be described.

EXAMPLE 1

Two flat joining members, or the first and second joining-members, made of aluminum alloy having the same shape and dimension were prepared (Materials: JIS A6063-T5, Dimension: 200 mm length×100 mm width×4 mm thickness). The lateral side of the first joining-member 1a and that of the second joining-member 1b were butted such that the upper surfaces thereof flushed with each other. Then, the butted portion 3 of the joining-members 1a and 1b was joined along the entire length thereof using the joining tool 10A according to the first embodiment shown in FIGS. 3 and 4 in accordance with the joining method of the first embodiment. In this example, the joining was performed in the state that the rotation axis Q of the rotor 11 coincided with the nominal line T of the surfaces of the joining-members 1a and 1b at the probe inserted position, that is, the rearward inclined angle θ of the rotation axis Q of the rotor 11 against the nominal line T was 0°.

In the joining tool 10A used in this example, the probe 13 had the same shaft configuration as the screw M5, the diameter of the end portion of the rotor 11 was 15 mm, and the length of the probe 13 was 4 mm. The dimension of the groove 15 of the joining tool 10A and the joining conditions employed in this example were as follows:

[Dimension of the Groove of the Joining Tool]
  Width of the groove w1 . . . 1 mm
  Average depth of the groove h1 . . . 1 mm
  Pitch of the groove p1 . . . 2 mm
[Joining Conditions]
  Rotating speed of the rotor . . . 1000 rpm
  Joining speed . . . 600 mm/min.

EXAMPLE 2

The butted portion of the aforementioned joining-members was joined along the entire length thereof using the joining tool 10B according to the second embodiment shown in FIGS. 5 and 6. The dimension of the groove of the joining tool 10B and the joining conditions employed in this example are shown below. The other dimensions of the joining tool and the joining conditions were the same as in the above Example 1.

[Dimension of the Groove of the Joining Tool]
  Width of the groove w2 . . . 1 mm
  Average depth of the groove h2 . . . 1 mm
  Pitch of the groove p2 . . . 2 mm

EXAMPLE 3

The butted portion of the aforementioned joining-members was joined along the entire length thereof using the joining tool 10C according to the third embodiment as shown in FIGS. 7 and 8. The dimensions of the groove of the joining tool 10C and the joining conditions employed in this example are shown below. The other dimensions of the joining tool and the joining conditions were the same as in the above Example 1.
[Dimension of the Stepped Portion of the Joining Tool]
  Radius difference between the adjacent stepped portions s . . . 0.5 mm

COMPARATIVE EXAMPLE 1

Figure 9:
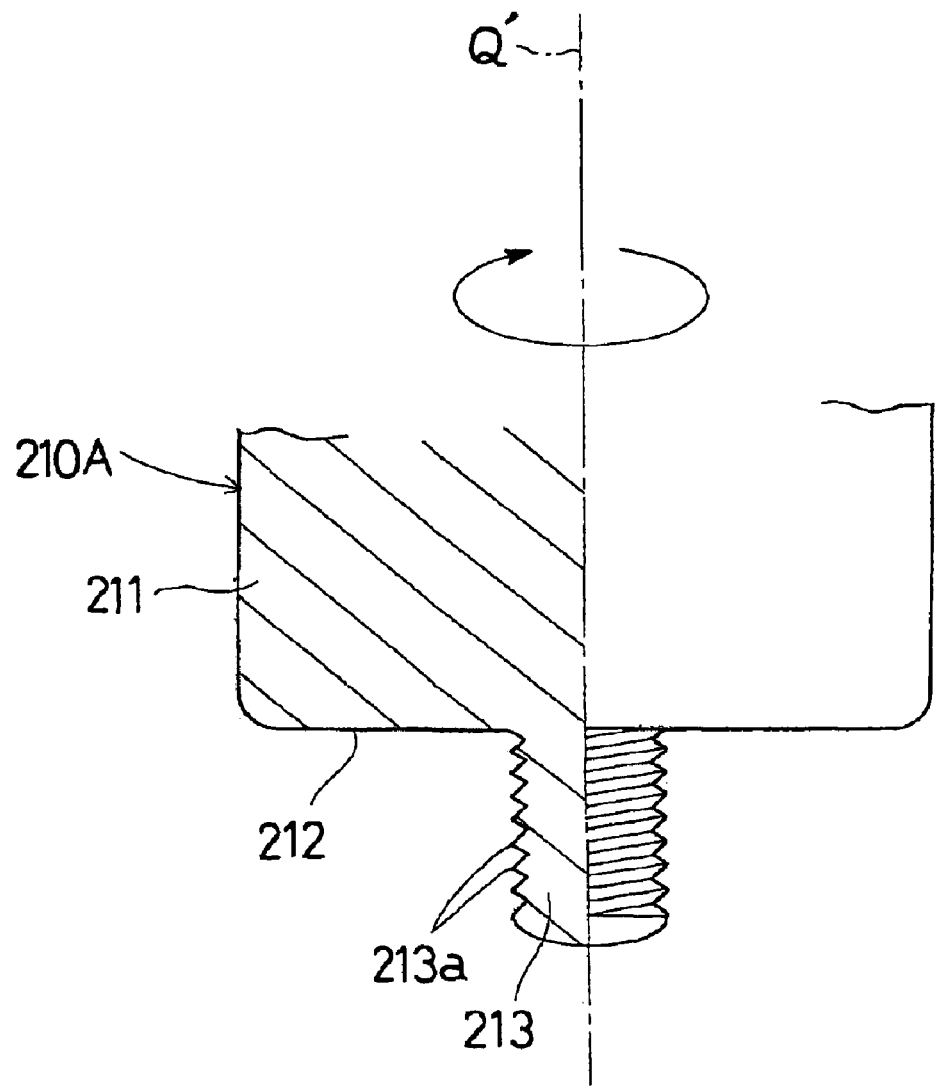
FIG. 9 is a half cross-sectional side view of the joining tool used in Comparative Example 1.

The butted portion of the aforementioned joining-members was joined along the entire length thereof using the joining tool 210A shown in FIG. 9. The other joining conditions were the same as in the aforementioned Example 1. Here, the end face 212 of the end portion of the rotor 211 of the joining tool 210A was formed into a flat surface perpendicular to the rotation axis Q'. No groove was provided on the end face 212. The other structure of the joining tool 210A was the same as that of the joining tool 10A of the first embodiment.

COMPARATIVE EXAMPLE 2

Figure 10:
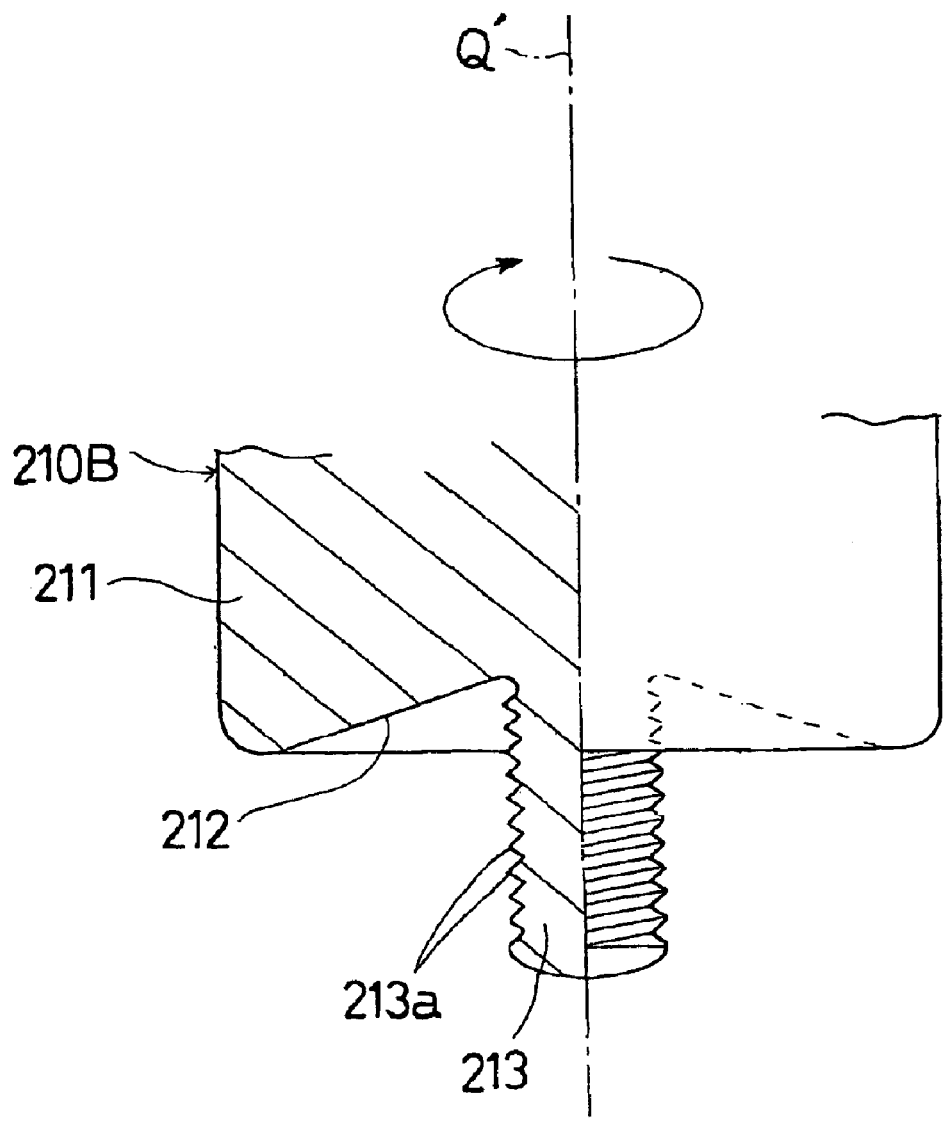
FIG. 10 is a half cross-sectional side view of the joining tool used in Comparative Example 2.
Figure 11:
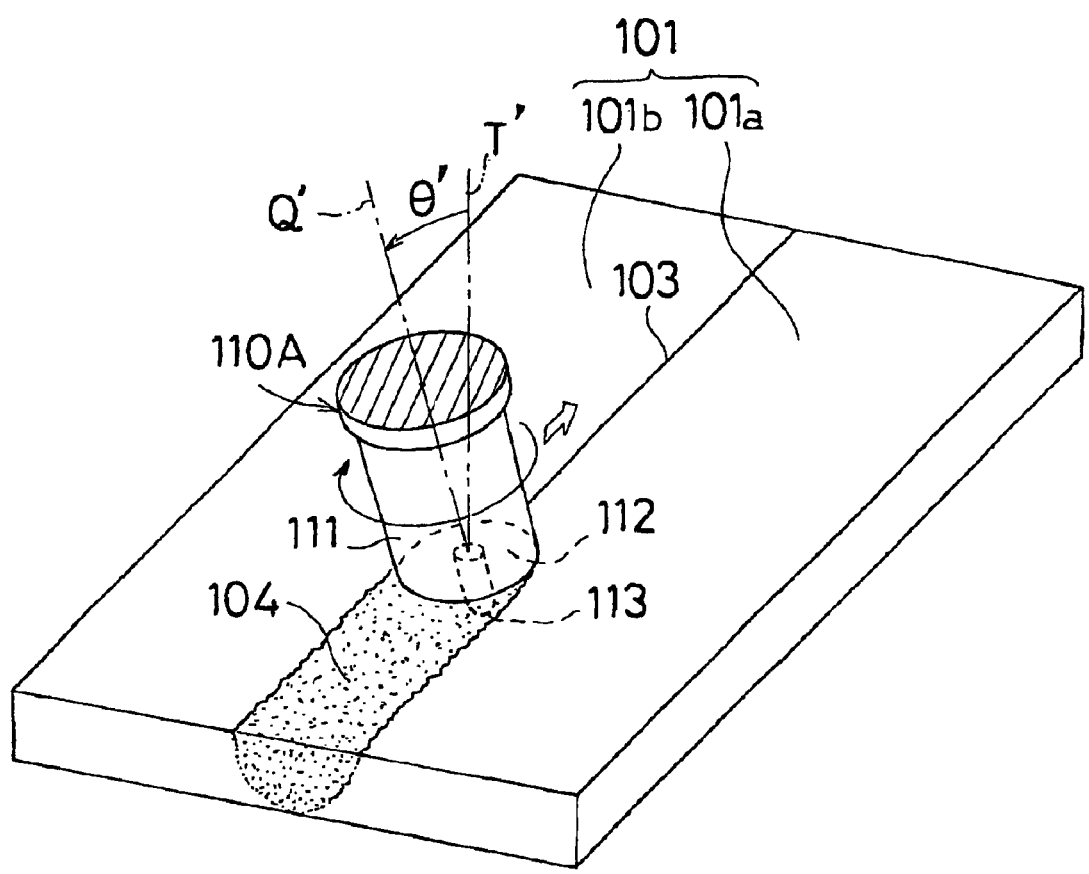
FIG. 11 is a perspective view showing the state in which the joining operation is in progress by using a conventional joining tool.

The butted portion of the aforementioned joining-members was joined along the entire length thereof using the joining tool 210B shown in FIG. 10. The other joining conditions were the same as in the aforementioned Example 1. Here, the end face 212 of the end portion of the rotor 211 of the joining tool 210B was formed into a reverse V-shaped concave cross-section dented from the periphery of the end face 212 toward the rotational center thereof. No groove was provided on the end face 212 The other structure of the joining tool 210B was the same as that of the joining tool 10A of the first embodiment.

COMPARATIVE EXAMPLE 3

The butted portion of the aforementioned joining-members was joined along the entire length thereof using the joining tool 210B shown in FIG. 10. Here, the rearward inclined angle θ of the rotation axis Q of the rotor 11 against the nominal line T was 3°. The other joining conditions were the same as in the aforementioned Example 1.

Regarding each joined member obtained by the aforementioned Examples 1 to 3 and Comparative Examples 1 to 3, a visual inspection was performed to check the surface condition of the joined portion, and X-ray examination was performed to find the joining defeats. The results are shown in Table 1.

TABLE 1

|  | Joining tool | Inclined angle θ | Surface condition of joined portion | Internal defects of joined portion |
| --- | --- | --- | --- | --- |
| Example 1 | 10A | 0° | ◎ | None |
| Example 2 | 10B | 0° | ○ | None |
| Example 3 | 10C | 0° | Δ | None |
| Comparative Example 1 | 210A | 0° | X | Yes |
| Comparative Example 2 | 210B | 0° | ○ | Yes |
| Comparative Example 3 | 210B | 3° | ○ | None |

In the column of "surface condition of joined portion" in Table 1, the mark X shows that the surface condition of the joined portion is poor. On the other hand, the marks Δ, ○ and ◎ show that the surface condition of the joined portion is good. The mark ◎ denotes the best condition, the mark ○ denotes the second best condition and the mark Δ denotes the third best condition.

As shown in Table 1, in Examples 1 to 3, each of the surface condition of the joined portion is good, no internal defect such as a hollow portion is generated in the joined portion, and the thickness of the joined portion is not decreased. This revealed that a good joined portion can be obtained by using these joining tools even if the rotation axis of the rotor is not inclined rearward relative to the joining direction at the time of joining. In particular, in Example 1, the joined portion with extremely good surface condition was formed. Therefore, it was confirmed that the butt joined member with extremely high joining quality can be obtained.

On the other hand, in the comparative Examples 1 and 2, the internal defects, such as hollow portions, were generated in the joined portion, and a good joined portion could not be formed. Also, in the comparative Example 1, burrs were generated on the surface of the joined portion, and the surface condition was poor. In the comparative Example 3, since the joining operation had to be performed in the state that the rotation axis of the rotor was inclined rearward against the joining direction, the joining operation was difficult.

As mentioned above, the present invention will be summarized as follows.

According to the friction agitation joining tool of the first aspect of the present invention of the present invention, the materials of the joining-members softened by the friction heat can be held firmly inside the end face of the end portion of the rotor at the time of joining. Thus, it is effectively prevented the escape of the materials, and the joined portion with extremely good condition can be formed. In addition, with this joining tool, at the time of joining, since the materials of the joining-members can be held firmly without inclining the rotation axis of the rotor relative to the joining direction, the joining operation can be easily performed.

According to the friction agitation joining tool of the second aspect of the present invention of the present invention, the materials of the joining-members softened by the friction heat can be held inside the concave end face of the end portion of the rotor at the time of joining. Thus, the escape of the materials can be effectively prevented, and the joined portion with good joining condition can be formed. In addition, with this joining tool, at the time of joining, since the materials of the joining-members can be held without inclining the rotation axis of the rotor relative to the joining direction, the joining operation can be performed easily.

According to the friction agitation joining tool of the third aspect of the present invention of the present invention, the peripheral surface of the end portion of the rotor can be strongly pressed onto the surfaces of the joining-members at the time of joining. Thus, the escape of the materials can be prevented. In addition, with this joining tool, at the time of joining, since the materials of the joining-members can be held without inclining the rotation axis of the rotor relative to the joining direction, the joining operation can be performed easily.

According to the friction agitation joining method according to the fourth aspect of the present invention of the present invention, a joined member with extremely high joining quality can be obtained, and the joining operation can be performed easily.

According to the friction agitation joining method according to the fifth aspect of the present invention of the present invention, a joined member with extremely high joining quality can be obtained and the joining operation can be performed easily.

According to the friction agitation joining method according to the sixth aspect of the present invention, a joined member with extremely high joining quality can be obtained, and the joining operation can be performed easily.

According to the joined member manufacturing method according to the seventh aspect of the present invention, a joined member with extremely high joining quality can be obtained, and the joining operation can be performed easily.

According to the joined member manufacturing -method according to the eighth aspect of present invention, the joined member with extremely high joining quality can be obtained, and the joining operation can be facilitated.

According to the joined member manufacturing method according to the ninth aspect of the present invention, the joined member with extremely high joining quality can be obtained, and the joining operation can be facilitated.

This application claims priority to Japanese Patent Application No. 2000-287123 filed on Sep. 21, 2000, the disclosure of which is incorporated by reference in its entirety.

The terms and descriptions in this specification are used only for explanatory purposes and the present invention is not limited to these terms and descriptions. It should be appreciated that there are many modifications and substitutions without departing from the spirit and the scope of the present invention which is defined by the appended claims. A present invention permits any design-change, unless it deviates from the soul, if it is within the limits by which the claim was performed.

INDUSTRIAL APPLICABILITY

As mentioned above, the friction agitation joining tool according to the present invention is suitably used as a joining tool for manufacturing various joined members, such as floor members, wall members, ceiling members, suspension arm members for ships, automobiles and railroad cars.

The friction agitation joining method according to the present invention is suitably used as a friction agitation joining method for manufacturing various joined members, such as floor members, wall members, ceiling members, suspension arms for ships, automobiles and railroad cars.

The method of manufacturing a joined member according to the present invention is suitably used as the method of manufacturing various joined members, such as floor materials, wall materials, ceiling materials, suspension arms, etc., for ships, automobiles and railroad cars.

What is claimed is:

1. A friction agitation joining tool comprising:
   a rotor having a concave end face to be pressed onto surfaces of a plurality of members to be joined; and
   a probe provided at a rotational center of the end face to protrude from the end face and to be inserted into a joining portion of the plurality of members, the probe having a diameter smaller than a diameter of the rotor, the end face being provided with at least one spiral groove surrounding the probe, and a width w1 of the at least one spiral groove being at least 0.5 mm and at most 2.0 mm.

2. The friction agitation joining tool according to claim 1, wherein the end face is dented from a periphery of the end face toward the rotational center of the end face with a predetermined inclination.

3. The friction agitation joining tool according to claim 1, wherein the at least one spiral groove comprises a plurality of spiral grooves provided with the end face at predetermined phase differences.

4. The friction agitation joining tool according to claim 1, wherein an average depth h1 of the at least one spiral groove is at least 0.5×w1 mm and at most 2×w1 mm.

5. The friction agitation joining tool according to claim 1, wherein the probe is provided with at least one agitation protrusion on an outer surface thereof.

6. A friction agitation joining tool comprising:
   a rotor having a concave end face to be pressed onto surfaces of a plurality of members to be joined; and
   a probe provided at a rotational center of the end face to protrude from the end face and to be inserted into a joining portion of the plurality of members, the probe having a diameter smaller than a diameter of the rotor, the end face being provided with at least one spiral groove surrounding the probe, and an average depth h1 of the at least one spiral groove is at least 0.5×w1 mm and at most 2×w1 mm, where w1 is a width of the at least one spiral groove.

7. The friction agitation joining tool according to claim 6, wherein the end face is dented from a periphery of the end face toward the rotational center of the end face with a predetermined inclination.

8. The friction agitation joining tool according to claim 6, wherein the at least one spiral groove comprises a plurality of spiral grooves provided with the end face at predetermined phase differences.

9. The friction agitation joining tool according to claim 6, wherein the probe is provided with at least one agitation protrusion on an outer surface thereof.

10. A friction agitation joining tool comprising:
    a rotor having a concave end face to be pressed onto surfaces of a plurality of members to be joined; and
    a probe provided at a rotational center of the end face to protrude from the end face and to be inserted into a joining portion of the plurality of members, the probe having a diameter smaller than a diameter of the rotor, the end face being provided with at least one annular groove surrounding the probe, and a width w2 of the at least one annular groove being at least 0.5 mm and at most 2.0 mm.

11. The friction agitation joining tool according to claim 10, wherein the end face is dented from a periphery of the end face toward the rotational center of the end face with a predetermined inclination.

12. The friction agitation joining tool according to claim 10, wherein the at least one annular groove comprises a plurality of annular grooves concentric with the rotational center of the end face.

13. The friction agitation joining tool according to claim 10, wherein an average depth h2 of the at least one annular groove is at least 0.5×w2 mm and at most 2×w2 mm.

14. The friction agitation joining tool according to claim 10, wherein the probe is provided with at least one agitation protrusion on an outer surface thereof.

15. A friction agitation joining tool comprising:
- a rotor having a concave end face to be pressed onto surfaces of a plurality of members to be joined; and
- a probe provided at a rotational center of the end face to protrude from the end face and to be inserted into a joining portion of the plurality of members, the probe having a diameter smaller than a diameter of the rotor, the end face being provided with at least one annular groove surrounding the probe, and an average depth h2 of the at least one annular groove is at least 0.5×w2 mm and at most 2×w2 mm, where w2 is a width of the at least one annular groove.

16. The friction agitation joining tool according to claim 15, wherein the end face is dented from a periphery of the end face toward the rotational center of the end face with a predetermined inclination.

17. The friction agitation joining tool according to claim 15, wherein the at least one annular groove comprises a plurality of annular grooves concentric with the rotational center of the end face.

18. The friction agitation joining tool according to claim 15, wherein the probe is provided with at least one agitation protrusion on an outer surface thereof.

19. A friction agitation joining tool comprising:
- a rotor having an end portion to be pressed onto surfaces of a plurality of members to be joined, the end portion having an end face being formed to have a concave surface; and
- a probe provided at a rotational center of the end face to protrude from the end face and to be inserted into a joining portion of the plurality of members, the probe having a diameter smaller than a diameter of the rotor, the end portion being provided with at least one stepped portion along an entire periphery of the end portion, and a difference in radius s between an inner periphery and an outer periphery of the at least one stepped portion is at least 0.3 mm and at most 1.0 mm.

20. The friction agitation joining tool according to claim 19, wherein the concave surface is dented from a periphery of the end face toward the rotational center of the end face with a predetermined inclination.

21. The friction agitation joining tool according to claim 19, wherein the probe is provided with at least one agitation protrusion on an outer surface thereof.

22. A friction agitation joining tool comprising:
- a rotor having a concave end face; and
- a probe provided at a rotational center of the end face to protrude from the end face and having a diameter smaller than a diameter of the rotor, the end face being provided with at least one spiral groove surrounding the probe, and a width w1 of the at least one spiral groove being at least 0.5 mm and at most 2.0 mm.

* * * * *